United States Patent [19]

Sato et al.

[11] Patent Number: 5,147,592
[45] Date of Patent: Sep. 15, 1992

[54] PROCESS OF AND APPARATUS FOR PREPARING OPTICAL RECORDING MEDIUM SUBSTRATES

[75] Inventors: Tetsuya Sato; Osamu Kanome, both of Kawasaki; Hitoshi Yoshino, Tokyo; Hirofumi Kamitakahara, Yokohama; Hisanori Hayashi, Kawasaki; Tsuyoshi Santoh, Yokohama, all of Japan

[73] Assignee: Canon Kabushiki Kaisha, Tokyo, Japan

[21] Appl. No.: 580,218

[22] Filed: Sep. 10, 1990

[30] Foreign Application Priority Data

Sep. 12, 1989 [JP] Japan .................. 1-234747

[51] Int. Cl.⁵ .............. B29C 47/00; B29C 47/88
[52] U.S. Cl. .................. 264/167; 29/121.6; 29/132; 264/1.3; 264/106; 264/210.2; 264/211.12; 425/327; 425/363; 425/377; 425/810
[58] Field of Search .......... 264/1.3, 106, 107, 167, 264/175, 177.1, 177.17, 210.2, 211.12, 216, 284, 296; 425/224, 327, 363, 377, 810; 100/155 R, 168, 169; 29/121.1, 121.6, 129.5, 132

[56] References Cited

U.S. PATENT DOCUMENTS

| | | | |
|---|---|---|---|
| 3,758,649 | 9/1973 | Frattarola | 264/1.3 |
| 3,882,207 | 5/1975 | Hannan et al. | 264/1.3 |
| 4,097,634 | 6/1978 | Bergh | 428/156 |
| 4,211,743 | 7/1980 | Nauta et al. | 264/284 |
| 4,543,225 | 9/1985 | Beaujean | 264/167 |
| 4,790,893 | 12/1988 | Watkins | 156/232 |

FOREIGN PATENT DOCUMENTS 369780  5/1990  European Pat. Off. .

Primary Examiner—Leo B. Tentoni
Attorney, Agent, or Firm—Fitzpatrick, Cella, Harper & Scinto

[57] ABSTRACT

A process for preparing a substrate sheet for optical recording mediums includes the steps of extruding a molten resin to form a resin sheet and bringing the resin sheet into pressure between a preformat roll and a roll disposed opposingly to said preformat roll to transfer a preformat pattern to the surface of the resin sheet, wherein the roll disposed opposingly to the preformat roll includes a roll whose surface is covered with an elastomeric resin.

7 Claims, 1 Drawing Sheet

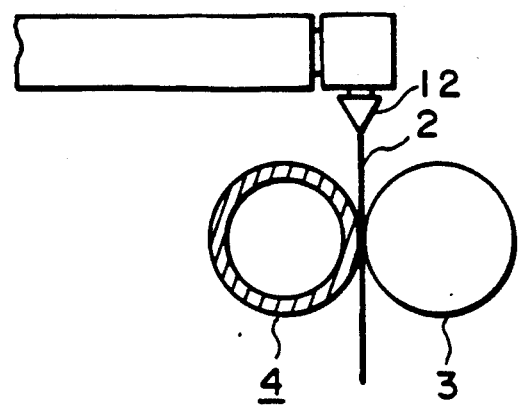
F I G. 1
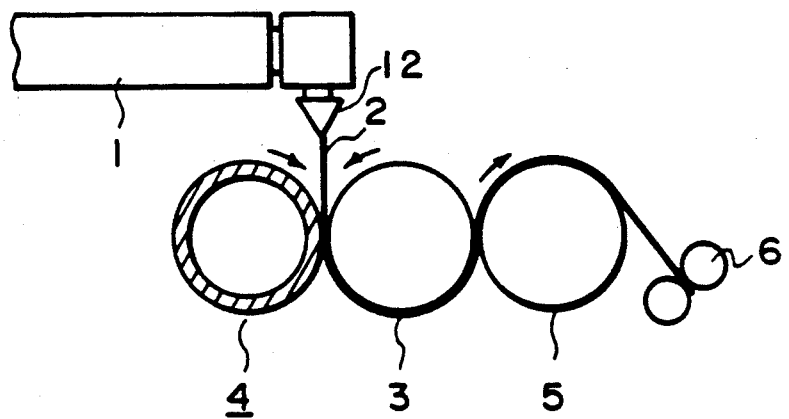
F I G. 2
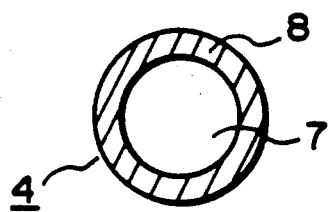
F I G. 3

PROCESS OF AND APPARATUS FOR PREPARING OPTICAL RECORDING MEDIUM SUBSTRATES

BACKGROUND OF THE INVENTION

1. Field of the Invention

The present invention relates to a process for preparing a substrate used for a high-density optical recording medium such as an optical disk or an optical card. It also relates to an apparatus for preparing the substrate.

2. Related Background Art

Substrates for optical recording mediums such as CDs, laser disks, DRAW disks and photomagnetic disks that optically record and reproduce information have been hitherto prepared by injection molding or compression molding. Although the substrates are required to have a high flatness or smoothness, these molding methods tend to cause warpage or inclusion of bubbles, and hence the detection of information by light may be greatly inhibited. Thus, great difficulties are involved in controlling temperature and pressure, assuring accuracy of a mold, or preventing generation of bubbles. An apparatus with a large scale is also required, resulting in a great increase in cost. Moreover, substrates are formed sheet-by-sheet in the compression molding, and hence complicated post-processing is required, resulting in a poor productivity.

Use of a plastic flat sheet enables easy manufacture of a smooth and uniform sheet with less inclusion of bubbles, and hence a method has been proposed in which a stamper is brought into close contact with this plastic flat sheet under application of pressure to transfer grooves to the sheet. However, a very high pressure must be used in order to apply pressure over the whole disc surface of the flat sheet.

As a means for solving this problem, a plastic sheet extruded from an extruder may be passed between a molding roll provided with a stamper in close adhesion and a mirror-finished roll so that grooves formed on the stamper can be thereby formed on the flat sheet under a low pressure, and then center holes and peripheries may be trimmed away. Substrates for optical recording mediums can be thus obtained using an apparatus of a small scale.

Incidentally, as materials for the substrates used for high-density optical recording mediums such as optical disks, polycarbonate resins have been mainly utilized in view of their properties such as impact properties and weathering properties.

Polycarbonates, however, have the disadvantage that they tend to cause double refraction and the double refraction may immediately occur when a strain is present. The occurrence of double refraction causes impairment of a C/N ratio at the time of recording-reproducing, and therefore must be decreased as far as possible.

As a means for solving this problem, the present applicants have proposed, in Japanese Patent Application No. 63-289828 filed Nov. 16, 1988, a process for preparing a substrate for an optical recording medium, comprising transferring a preformat pattern to a resin sheet extruded from a die, by the use of a three-roll system, wherein the temperature and rotational speed of each of three rolls are controlled so that the double refraction in the resin sheet can be decreased.

Employment of this process has made it possible to obtain a substrate for optical recording mediums that causes less double refraction. However, more than just to decrease the double refraction, it is sought to uniformly decrease double refraction over the whole surface of a substrate.

SUMMARY OF THE INVENTION

An object of the present invention is to provide a process for preparing a substrate sheet for optical recording mediums, that can prepare in a good mass productivity a substrate sheet for optical recording mediums on which fine preformat patterns of micron order can be transferred with accuracy and in which double refraction has been uniformly decreased.

Another object of the present invention is to provide an apparatus for preparing a substrate sheet for optical recording mediums, that can prepare in a good mass productivity a substrate sheet for optical recording mediums on which fine preformat patterns of micron order can be transferred with accuracy and in which double refraction has been uniformly decreased.

Taking account of the above objects, the present inventors made various studies. They noted the fact that, when a resin sheet is pressed between rolls, the heat of the resin sheet is transferred to a metallic roll having a higher thermal conductivity and consequently the resin sheet is cooled to a temperature lower than its glass transition temperature, as well as the fact that when a resin sheet is pressed between rolls, a strain is produced because of the pressure applied to the resin sheet. As a result of the studies, they found that these facts are responsible for the double refraction of a substrate sheet for optical recording mediums, and thus have accomplished the present invention.

The process of the present invention for preparing a substrate sheet for optical recording mediums is characterized by a process for preparing a substrate sheet for optical recording mediums, comprising the steps of extruding a molten resin to form a resin sheet and bringing said resin sheet into pressure between a preformat roll and a roll disposed oppositely to said preformat roll to transfer a preformat pattern to the surface of the resin sheet, wherein;

said roll disposed oppositely to the preformat roll comprises a roll whose surface is covered with an elastomeric resin.

The apparatus of the present invention for preparing a substrate sheet for optical recording mediums is characterized by an apparatus for preparing a substrate sheet for optical recording mediums, comprising a means for extruding a molten resin to form a resin sheet, and a preformat roll and a roll disposed oppositely to the preformat roll between which said resin sheet is pressed to transfer a preformat pattern to the surface of the resin sheet, wherein;

the surface of said roll disposed oppositely to the preformat roll is covered with an elastomeric resin.

According to the present invention, the elastomeric resin cover formed on the surface of a roll disposed oppositely to a preformat roll acts as a heat insulation layer and can maintain the temperature of the resin sheet to a temperature higher than the glass transition temperature when the resin sheet formed by extrusion is pressed between the rolls. Thus, it is presumed that a substrate sheet for optical recording mediums with less double refraction can be obtained since the resin sheet is fixed in the state in which no strain is applied thereto.

It is also presumed that a substrate sheet for optical recording mediums that causes less strain can be obtained since the covering of a roll surface with an elastomeric resin prevents the sheet from being forcibly rolled when pressed between the rolls.

BRIEF DESCRIPTION OF THE DRAWINGS

FIGS. 1 and 2 are schematic illustrations of the embodiments of the apparatus for preparing substrate sheet for optical recording mediums according to the present invention.

FIG. 3 is an enlarged view of a roll having on its surface an elastomeric resin cover.

DESCRIPTION OF THE PREFERRED EMBODIMENTS

The present invention will be described below with reference to the drawings.

FIGS. 1 and 2 each schematically illustrate an embodiment of the process for preparing a substrate sheet for optical recording mediums according to the present invention.

According to the preparation process shown in FIG. 1, a resin serving as a material for a substrate is melt-extruded using a melt extruder 1 to form a resin sheet 2 which serves as a substrate sheet for optical recording mediums and which is extruded through T-die 12. The resulting resin sheet 2 is pressed between a preformat roll 3 having on its surface a preformat pattern and a roll 4 disposed opposingly to the preformat roll and covered on its surface with an elastomeric resin, and the preformat pattern is transferred to the surface of the resin sheet 2. A substrate sheet for optical recording mediums can be thus prepared.

The preparation process shown in FIG. 2 is a process in which a preformat pattern is transferred to the resin sheet 2 by the use of three rolls which are horizontally arranged. In FIG. 2, the numeral 1 denotes an extruder; 2, a resin sheet; 3, a second roll which is a preformat roll having on its surface a preformat pattern; 4, a first roll whose surface is covered with an elastomeric resin; 5, a mirror-finished pressure roll; and 6, a take-up unit.

The distances between the rolls 3 and 4 and between the rolls 3 and 5 are made controllable so that the preformat pattern on the second roll 3 can be well transferred to the surface of the resin sheet 2. The resin sheet 2 extruded from the extruder 1 through T-die 12 is inserted between the rolls 3 and 4 and between the rolls 3 and 5 in a softened state, where the preformat pattern on the second roll 3 and the mirror surface of the pressure roll 5 are successively transferred. A substrate sheet for optical recording mediums can be thus formed.

FIG. 3 is an enlarged view of the roll 4 disposed opposingly to the preformat roll 3 and having on its surface an elastomeric resin cover. In FIG. 3, the numeral 7 denotes a roll substrate; and 8, an elastomeric resin with which the roll substrate 7 is covered. The elastomeric resin used in the present invention should preferably have a thermal resistance since the roll 4 itself is heated and the resin sheet almost in a molten state comes into contact with the roll 4. For example, when polycarbonate is used as the resin, the roll 4 is heated to have its surface temperature of from 120° C. to 150° C. and is brought into contact with a polycarbonate resin sheet of about 250° C. Hence, the elastomeric resin should preferably have a thermal resistance against a temperature of 200° C. or more, and particularly 250° C. or more.

The surface of the roll covered with the elastomeric resin is required to be mirror-finished to a certain degree in order to improve the accuracy of the substrate to which preformat patterns are transferred. For this purpose, the surface of the elastomeric resin should preferably be polished. More specifically, its surface accuracy should preferably be controlled to be 3 μm or less, and particularly 1 μm or less.

The elastomeric resin that can meet the above requirements may preferably include silicone resins and fluorine resins.

This elastomeric resin cover may be desirably formed so as to function as a heat insulation layer. Namely, if a metallic roll having no elastomeric resin cover 8 is used as the roll 4, the resin sheet 2 comes into contact with a metallic roll 4 having a good thermal conductivity when pressed between rolls. As a result, the heat of the resin sheet 2 is mostly transferred to the roll 4 and cooled, and as the resin sheet 2 is fixed in that state it retains the strain produced when it is pressed between rolls, so that a substrate sheet for optical recording mediums with a large double refraction is formed. However, the heat insulation layer comprised of the elastomeric resin cover can control the cooling of the resin sheet. More specifically, it can prevent heat dissipation from the resin sheet 2 when the resin sheet is pressed between rolls, so that the strain produced in the resin sheet 2 pressed between rolls does not remain and a substrate sheet for optical recording mediums with a low double refraction can be obtained.

The covering of the roll surface with the elastomeric resin can bring about a certain degree of relaxation of the pressure applied to the resin sheet, so that a strain produced in the resin sheet can be decreased. In addition, a resin sheet extruded from a T-die has an irregular thickness, and hence the pressure applied to a thick portion becomes much larger, resulting also in a large strain produced in the resin sheet. Against this problem also, the covering of the roll with the elastomeric resin can achieve a certain degree of absorption of the thickness irregularity, so that the pressure applied to the resin sheet can be made uniform.

The elastomeric resin cover 8 can suppress irregularity of double refraction when its thickness is so designed as to enable relaxation of the pressure applied to the resin sheet 2 and also to achieve uniform conduction of heat from the roll to the resin cover surface. Stated specifically, the thickness may preferably be set in the range of from 0.1 to 5 mm, and particularly from 0.5 to 3 mm, in approximation.

In the present invention, the double refraction (single path) of the substrate sheet may preferably be 20 nm or less, and particularly 15 nm or less, over the whole surface in a case of using the light having a wavelength used in recording-reproducing. This is because the fluctuation of reflectance becomes smaller and the S/N ratio at the time of reproducing can be improved for an optical recording medium on which the light is made incident through a substrate to carry out recording and/or reproducing.

In the roll 4, a metal is used for the material used for the roll substrate 7. For example, stainless steel, chromium steel, chromium-plated steel or the like can be preferably used. This roll substrate 7 may also preferably be mirror-finished on its surface.

A process for preparing a substrate sheet for optical recording mediums according to the present invention will be described below in detail with reference to FIG. 2.

In the present invention, resin pellets fed into an extruder 1 are first heated and melted in a barrel of the extruder 1, pressed forward by a screw provided inside the extruder, and then formed into a sheet through a T-die 12. In order to enable accurate transfer of the preformat pattern, the T-die may preferably be so disposed that a resin sheet is extruded to the gap between the preformat roll 3 and the roll 4.

Next, the resin sheet extruded from the T-die is pressed between the preformat roll 3 and the roll 4, and thus the preformat pattern is transferred. Here, the resin sheet 2 may preferably be almost in a molten state. This is due to the fact that the resin can thereby be sufficiently pressed into the uneven surfaces of the stampers and hence fine patterns can be accurately transferred. For this reason, the T-die may preferably be kept heated to a temperature as high as possible so long as the resin may not burn or scorch, and may preferably be heated to a glass transition temperature of the resin (hereinafter "Tg") $+110°$ C. to $Tg+200°$ C., and particularly $Tg+130°$ C. to $Tg+190°$ C. In the case of polycarbonate resins, for example, it may preferably be heated to from 260° C. to 340° C., particularly from 280° C. to 330° C., and more particularly from 290° C. to 320° C. In addition, since the preformat pattern may not be well transferred it tends to cause double refraction when the resin sheet is cooled between the T-die and preformat roll, the distance between the T-die and the point at which the resin sheet is pressed between the preformat roll 3 and the first roll 4 may preferably be 20 cm or less, particularly 15 cm or less, and more particularly 10 cm or less. Their surrounding atmosphere should also preferably be kept at a temperature of 60° C. or higher.

The apparatus may also preferably have the constitution of vertical extrusion as shown in FIG. 2, where the resin sheet is pressed between the rolls at the point vertically beneath the T-die so that the resin sheet can be correctly extruded to that point. This is for the reason that the vertical extrusion enables more correct extrusion, than horizontal extrusion, of the resin sheet to the point it is pressed between the rolls since the resin is nearly in a molten state.

The surface temperatures of the preformat roll 3 and the rolls 4 and 5 may vary depending on the resin to be used. When, for example, a polycarbonate resin is used, the temperature of the preformat roll may be set in the range of from 135° to 145° C., and the temperature of the third roll 5, usually, from 140° to 150° C., taking account of the heat distortion temperature of from 140° to 150° C. of the polycarbonate. The temperature of the first roll having on its surface the elastomeric resin cover may be set to a temperature of, for example, from 90° to 120° C., which is lower than that of the preformat roll so that the resin sheet may be readily moved forward in the state it has come into close contact with the preformat roll 3.

In the process for preparing the optical recording medium of the present invention, the preformat roll having on its surface a preformat pattern can be prepared by fastening on a mirror-finished roll substrate a nickel stamper used in the manufacture of a conventional substrate for an optical recording medium, or by forming by photolithography a preformat pattern directly on a roll substrate or on a pattern-forming layer provided on a roll substrate.

An ordinary mirror-finished roll can be used as the third roll 5. As roll substrates for the rolls 3 and 5, a chromium-plated steel product or the like can be used.

The roll diameters and peripheral speeds of the rolls 3, 4 and 5 may vary depending on the thickness of the substrate sheet for optical recording mediums to be formed. Taking account of the transfer accuracy of a preformat pattern to the resin sheet at the time the resin sheet is pressed between rolls, the temperature control of the resin sheet or the prevention of accumulation of heat to the resin cover of the roll 4, the diameter of a roll should preferably be from 200 to 450 mm, and particularly from 250 to 350 mm when the resin sheet has a thickness of from 0.3 to 2 mm. The peripheral speed of a roll should preferably be from 0.5 to 5 m/min., and particularly from 1 to 4 m/min.

The preformat pattern the preformat roll 3 of the present invention has on its surface specifically refers to a pattern corresponding with, for example, tracking grooves used for optical disks or optical cards, which groove(s) may be spiral, concentrically circular, or parallel, and have a width of from 0.5 $\mu$m to 2 $\mu$m, a pitch of 1.0 $\mu$m to 5 $\mu$m and a depth of from 200 Å to 5,000 Å, in approximation. It may also refer to a pattern corresponding with tracking grooves used for optical disks or optical cards, which groove(s) may be spiral, concentrically circular, or parallel, and have a width of from 2 $\mu$m to 5 $\mu$m, a pitch of 8 $\mu$m to 15 $\mu$m and a depth of from 200 Å to 5,000 Å, in approximation.

As resins used as materials for the substrate, thermoplastic resins having a high transmission to the light used for recording and reproduction are preferred, including, for example, acrylic resins, polyester resins, polycarbonate resins, vinyl resins, polysulfone resins, polyolefin resins, and cellulose derivatives.

As described above, the present invention makes it possible to;

(1) obtain substrates for optical recording mediums that have less optical anisotropy and are uniform;

(2) obtain substrate sheets for optical recording mediums on which preformat patterns have been transferred with good accuracy;

(3) continuously carry out the formation of a resin sheet and transfer of preformat patterns, and obtain substrates for optical recording mediums in a good mass productivity and low cost; and (4) readily control the cooling of a resin sheet because of the heat insulation layer on the roll surface, and thus readily prepare substrates for optical recording mediums with a low double refraction.

EXAMPLES

The present invention will be specifically described below by giving Examples.

EXAMPLE 1

Using the apparatus as shown in FIG. 2, a substrate sheet for optical recording mediums was prepared.

As the first roll 4, a roll substrate of 300 mm in diameter, made of steel material was covered with a silicone resin (SE1188, trademark for a product of Toray Silicone Co., Ltd.) in a thickness of 2 mm, and its surface was mirror-finished.

As the preformat roll 3, a stamper of 0.2 mm thick made of nickel and having a preformat pattern was fastened with screws on a mirror-finished roll substrate of 300 mm in diameter, made of chromium-plated steel. The preformat pattern was a pattern corresponding with a tracking groove of a spiral form, having a groove width of 0.6 μm, a pitch of 1.6 μm and a depth of 1,000 Å, used for an optical disk of 13 cm in diameter.

As the third roll 5, a mirror-finished roll of 300 mm in diameter, made of chromium-plated steel was used.

A polycarbonate resin (trade name: L-1250; a product of Teijin Chemicals Co., Ltd.) was extruded from the extruder 1 to form the resin sheet 2 of 300 mm in width, which was then pressed between the first roll 4 and the preformat roll 3 so that the preformat pattern was transferred to the surface of the polycarbonate resin sheet 2. A substrate sheet of 1.2 mm thick for optical disks was thus prepared. The temperature of the T-die was controlled to be 300° C.

The surface temperature of the first roll 4 was controlled to be 180° C.; that of the preformat roll 3, to be 140° C.; and that of the third roll 5, to be 135° C. The rotational speed of each roll was controlled to be 2 m/min.

On the substrate sheet for optical disks thus prepared, double refraction values at 15 points arbitrarily selected within the region in which a preformat pattern was transferred were measured to reveal that the values were 15 nm or less at all points. The preformat pattern was confirmed to have been transferred in a good state.

COMPARATIVE EXAMPLE 1

Example 1 was repeated to prepare a substrate sheet for optical disks, except that the first roll 4 used in Example 1 was replaced with a mirror-finished roll of 300 mm in diameter, made of chromium-plated steel.

The resulting substrate sheet for optical disks was evaluated in the same manner as in Example 1 to reveal that the values of double refraction ranged from 5 to 50 nm, which were very non-uniform.

EXAMPLE 2

As the first roll 4, a roll substrate of 300 mm in diameter, made of steel was mirror-finished. Thereafter, the resulting roll substrate was covered with a heat-shrinkable tubing (a product of Gunze Ltd.) of 1 mm thick made of a fluorine resin PFA and then heated at 150° C. to cause the tube to shrink. Thereafter, the surface of the tube was polished to have a surface accuracy of 2 μm or less.

As the preformat roll 3, a roll substrate of 300 mm in diameter, made of chromium-plated steel was mirror-finished. Thereafter, a stamper of 0.2 mm thick made of nickel and having a preformat pattern on its surface was fastened by a mechanical means on the surface of the mirror-finished roll substrate. The preformat pattern was a pattern corresponding with tracking grooves having a groove width of 3 μm, a pitch of 12 μm and a depth of 3,000 Å, used for an optical card on which the grooves were formed in parallel in a longitudinal direction in a rectangular region of 54 mm in length and 85 mm in breadth.

As the third roll 5, a mirror-finished roll of 300 mm in diameter, made of chromium-plated steel was used. The apparatus as shown in FIG. 2 for preparing a substrate sheet for optical cards was thus made up.

Next, a polycarbonate resin (trade name: L-1250; a product of Teijin Chemicals Co., Ltd.) was extruded from the extruder 1 to form the resin sheet 2 of 250 mm in width, which was then pressed between the first roll 4 and the preformat roll 3 so that the preformat pattern was transferred to the surface of the polycarbonate resin sheet 2. A substrate sheet of 0.4 mm thick for optical cards was thus prepared. The temperature of the T-die was controlled to be 310° C.

The surface temperature of the first roll 4 was controlled to be 120° C.; that of the preformat roll 3, to be 145° C.; and that of the third roll 5, to be 130° C. The rotational speed of each roll was controlled to be 4 m/min.

On the substrate sheet for optical cards thus prepared, double refraction values at 15 points arbitrarily selected within the region in which a preformat pattern was transferred were measured to reveal that the values were 20 nm or less at all points. The preformat pattern was confirmed to have been transferred in a good state.

COMPARATIVE EXAMPLE 2

Example 2 was repeated to prepare a substrate sheet for optical cards, except that the first roll 4 used in Example 2 was replaced with a mirror-finished roll of 300 mm in diameter, made of chromium-plated steel.

The resulting substrate sheet for optical cards was evaluated in the same manner as in Example 2 to reveal that the values of double refraction ranged from 5 to 50 nm, which were very non-uniform.

EXAMPLE 3

As the first roll 4, a roll substrate of 250 mm in diameter, made of steel was mirror-finished. Thereafter, the resulting roll substrate was covered with a heat-shrinkable tubing (a product of Gunze Ltd.) of 0.3 mm thick made of a fluorine resin PFA and then heated at 120° C. to cause the tube to shrink. Thereafter, the surface of the tube was polished to have a surface accuracy of 1 μm or less.

As the preformat roll 3, a roll substrate of 250 mm in diameter, made of chromium-plated steel was mirror-finished. Thereafter, a stamper of 0.1 mm thick made of nickel and having a preformat pattern on its surface was fastened with screws on the surface of the mirror-finished roll substrate. The preformat pattern was a pattern corresponding with tracking grooves having a groove width of 3 μm, a pitch of 12 μm and a depth of 3,000 Å, used for an optical card on which the grooves were formed in parallel in a longitudinal direction in a rectangular region of 54 mm in length and 85 mm in breadth.

As the third roll 5, a mirror-finished roll of 250 mm in diameter, made of chromium-plated steel was used. The apparatus as shown in FIG. 2 for preparing a substrate sheet for optical cards was thus made up.

Next, a polycarbonate resin (trade name: L-1225; a product of Teijin Chemicals Co., Ltd.) was extruded from the extruder 1 to form the resin sheet 2 of 300 mm in width, which was then pressed between the first roll 4 and the preformat roll 3 so that the preformat pattern was transferred to the surface of the polycarbonate resin sheet 2. A substrate sheet of 0.4 mm thick for optical cards was thus prepared. The temperature of the T-die was controlled to be 300° C.

The surface temperature of the first roll 4 was controlled to be 120° C.; that of the preformat roll 3, to be 150° C.; and that of the third roll 5, to be 135° C. The rotational speed of each roll was controlled to be 3 m/min.

On the substrate sheet for optical cards thus prepared, double refraction values at 15 points arbitrarily selected within the region in which a preformat pattern was transferred were measured to reveal that the values were 15 nm or less at all points. The preformat pattern was confirmed to have been transferred in a good state.

COMPARATIVE EXAMPLE 3

Example 3 was repeated to prepare a substrate sheet for optical cards, except that the first roll 4 used in Example 3 was replaced with a mirror-finished roll of 250 mm in diameter, made of chromium-plated steel.

The resulting substrate sheet for optical cards was evaluated in the same manner as in Example 3 to reveal that the values of double refraction ranged from 5 to 50 nm, which were very non-uniform.

In the measurement of double refraction in the above Examples 1 to 3 and Comparative Examples 1 to 3, a semiconductor laser was adjusted to emit a beam of 1 mm in diameter, and the beam was made incident on the molded substrate sheets to measure the degree of polarization of the light transmitted through them. Light with a wavelength of 830 nm was used.

We claim:

1. A process for preparing a substrate sheet for optical recording mediums, comprising the steps of extruding a molten resin from a T-die to form a resin sheet and pressing said resin sheet in a substantially molten state between a preformat roll and a roll disposed opposingly to said preformat roll to transfer a preformat pattern to a surface of the resin sheet such that said resin sheet is brought into direct contact with the circumferential surface of said roll disposed opposingly to said preformat roll while said resin sheet is maintained at a temperature higher than a surface temperature of said roll disposed opposingly to the preformat roll, wherein
said roll disposed opposingly to the preformat roll comprises a metal roll a surface of which is covered with an elastomeric resin having a thickness ranging from 0.1 mm to 5 mm.

2. A process for preparing a substrate sheet for optical recording mediums according to claim 1, wherein said elastomeric resin comprises a silicone resin.

3. An apparatus for preparing a substrate sheet for optical recording mediums, comprising a means for extruding a molten resin from a T-die to form a resin sheet; a preformat roll and a roll disposed opposingly to the preformat roll between which said resin sheet is pressed to transfer a preformat pattern to a surface of the resin sheet; a means for bringing said resin sheet into direct contact with the circumferential surface of said roll disposed opposingly to said preformat roll; and a means for heating said resin sheet to a temperature higher than a surface temperature of said roll disposed opposingly to the preformat roll, wherein;
said roll disposed opposingly to the preformat roll comprises a metal roll substrate, a surface of which is covered with an elastomeric resin having a thickness ranging from 0.1 mm to 5 mm.

4. An apparatus for preparing a substrate sheet for optical recording mediums according to claim 3, wherein said elastomeric resin comprises a silicone resin or a fluorine resin.

5. An apparatus for preparing a substrate sheet for optical recording mediums, comprising a means for extruding a molten resin to form a resin sheet; a preformat roll and a roll disposed opposingly to the preformat roll between which said resin sheet is pressed to transfer a preformat pattern to the surface of the resin sheet; a means for bringing said resin sheet into direct contact with the circumferential surface of said roll disposed opposingly to said preformat roll; and a means for heating said resin sheet to a temperature higher than a surface temperature of said roll disposed opposingly to the preformat roll, wherein;
said roll disposed opposingly to the preformat roll is provided on its surface with a cover comprised of a material having a low thermal conductivity and an elasticity; said cover being effective as a heat insulating layer against the resin sheet, which suppresses conduction of heat of said resin sheet to the rolls so that said resin sheet has a double refraction value lower than a double refraction value produced by heat dissipation from the resin sheet to the rolls when said resin sheet is pressed between the preformat roll and a roll whose surface is not provided with said cover.

6. A process for preparing a substrate sheet for optical recording mediums according to claim 1, wherein said elastomeric resin comprises a fluorine resin.

7. An apparatus for preparing a substrate sheet for optical recording mediums according to claim 3, wherein said elastomeric resin comprises a fluorine resin.

* * * * *